US011089540B2

(12) United States Patent
Robertson et al.

(10) Patent No.: US 11,089,540 B2
(45) Date of Patent: Aug. 10, 2021

(54) VARIABLE ADDRESS LENGTH COMMUNICATION PROTOCOL

(71) Applicant: UltraSoC Technologies Limited, Cambridge (GB)

(72) Inventors: Iain Robertson, Cambridge (GB); Callum Stewart, Cambridge (GB)

(73) Assignee: MENTOR GRAPHICS CORPORATION, Wilsonville, OR (US)

( * ) Notice: Subject to any disclaimer, the term of this patent is extended or adjusted under 35 U.S.C. 154(b) by 0 days.

(21) Appl. No.: 16/460,448

(22) Filed: Jul. 2, 2019

(65) Prior Publication Data

US 2020/0015151 A1 Jan. 9, 2020

(30) Foreign Application Priority Data

Jul. 5, 2018 (GB) ...................................... 1811062

(51) Int. Cl.
*H04W 48/16* (2009.01)
*H04W 76/11* (2018.01)
(Continued)

(52) U.S. Cl.
CPC ........... *H04W 48/16* (2013.01); *H04W 48/08* (2013.01); *H04W 76/11* (2018.02); *H04L 69/22* (2013.01)

(58) Field of Classification Search
CPC ..... H04W 48/16; H04W 76/11; H04W 48/08; H04L 69/22; H04L 61/2038;
(Continued)

(56) References Cited

U.S. PATENT DOCUMENTS 5,237,322 A 8/1993 Heberle
5,550,827 A * 8/1996 Fernstrom ............... H04L 29/06
370/392

(Continued)

FOREIGN PATENT DOCUMENTS

EP 0 333 166 A1 9/1989
GB 1285355 A 8/1972
WO 2013/071961 A1 5/2013

OTHER PUBLICATIONS

Ivanov et al; "Indirect Test Architecture for SoC Testing"; IEEE Transactions on Computer Aided Design of Integrated Circuits and Systems; vol. 23, No. 7; Jul. 1, 2004; pp. 1128-1142.

*Primary Examiner* — Jeffrey M Rutkowski
*Assistant Examiner* — Chae S Lee
(74) *Attorney, Agent, or Firm* — Lempia Summerfield Katz LLC

(57) ABSTRACT

A communication unit and discoverable unit communicate according to a protocol in which unit addresses are not of a predetermined length. The communication unit sends a discovery request to the discoverable unit. The discoverable unit receives the discovery request and generates a discovery response. The discovery response comprises an address field of length unknown to the communication unit, populated with an address of the discoverable unit. The discovery response also comprises a flag following the address field. The discoverable unit sends the discovery response to the communication unit. The communication unit receives the discovery response and determines the address field length by counting the number of bits prior to the flag.

18 Claims, 5 Drawing Sheets

(51) Int. Cl.
  *H04W 48/08* (2009.01)
  *H04L 29/06* (2006.01)
(58) Field of Classification Search
  CPC .................. H04L 61/6072; G06F 13/00; G01R 31/31705; G01R 31/31722
  See application file for complete search history.

(56) References Cited

U.S. PATENT DOCUMENTS

| | | | |
|---|---|---|---|
| 7,302,256 B1* | 11/2007 | O'Hara, Jr. ......... | H04W 40/246 |
| | | | 370/329 |
| 2017/0223579 A1* | 8/2017 | Lee ..................... | H04W 52/028 |
| 2019/0089686 A1* | 3/2019 | Jung ................... | H04L 67/104 |
| 2019/0149449 A1* | 5/2019 | Morris .................. | H04L 45/04 |
| | | | 709/238 |

* cited by examiner

VARIABLE ADDRESS LENGTH COMMUNICATION PROTOCOL

BACKGROUND

This disclosure relates to a communications protocol, and in particular to an addressing mechanism of that communications protocol.

Typically, devices within a system communicate according to a communications protocol which the system as a whole adheres to. Data to be communicated from a source unit to a destination unit within the system is segmented and transported in packets. Each packet has a header which contains, amongst other information, an address of the intended recipient of the packet.

At the time that the communications protocol is established, the number of devices in a system which will communicate according to the communications protocol is generally not known. A set number of bits may be dedicated to the addressing field of the packet header. This set number of bits limits the number of individually addressable entities. For example, an address field of 1 byte enables 256 entities to be individual addressed. For a given system, the set number of bits may be too small, such that not all the devices in the system are individually addressable. To reduce the likelihood of this, the protocol may set a very large address field which is capable of supporting a system having a very large number of devices.

In some systems, it is desirable to communicate a large quantity of data. For example, in System-on-Chip (SoC) devices in which multiple core devices are integrated on a single chip, there is a high volume of traffic conveyed between the individual units on chip. Additionally, each core device is typically debugged. This involves a large quantity of debug data being routed through the integrated circuit chip, and typically funnelled off chip to external debugging tools. High efficiency and low latency transporting the data is important. To achieve this, it is desirable to maximise the proportion of each packet which is dedicated to the payload and minimise the proportion of the packet which is dedicated to the header. A communications protocol which sets a larger address field than is needed by the system introduces unnecessary overhead into the communications, thereby reducing throughput. Thus, there is a need for an addressing protocol which supports a variable number of connected devices, but which reduces the overhead required in addressing those devices.

SUMMARY OF THE INVENTION

According to a first aspect, there is provided a communication unit configured to communicate according to a protocol in which unit addresses are not of a predetermined length, the communication unit configured to: send a discovery request to a discoverable unit; receive a discovery response from the discoverable unit, the discovery response comprising an address field of length unknown to the communication unit, the discovery response further comprising a flag following the address field; and determine the address field length by counting the number of bits prior to the flag.

The address field may be populated with bits all having a first bit value, the flag having a second bit value different to the first bit value.

The discovery response may comprise a header and a payload, the header comprising the address field and further fields, the payload comprising the flag, the further fields being of known length to the communication unit. The flag may be the first bit of the payload. The further fields may comprise a type identifier field populated with bits all having the first bit value, and the communication unit may be configured to interpret the type identifier as indicating the discovery response to be a response to a discovery request.

The communication unit may be configured to interpret the determined address field length as indicating a number of individually addressable entities.

The communication unit may be configured to subsequently send a message to a first one of the individually addressable entities by concatenating a header and a payload, the header comprising an address field having the determined address field length, the address field populated with the address of the first one of the individually addressable entities.

The discovery request may comprise an address field, a type identifier field and a payload, the address field, type identifier field and payload all being populated with bits having the same bit value.

According to a second aspect, there is provided a discoverable unit configured to communicate according to a protocol in which unit addresses are not of a predetermined length, the discoverable unit configured to: receive a discovery request from a communication unit; generate a discovery response, the discovery response comprising an address field of length not fixed by the protocol, the address field populated with an address of the discoverable unit, the discovery response further comprising a flag following the address field; and send the discovery response to the communication unit.

The discovery response may comprise a header and a payload, the header comprising the address field and further fields, the payload comprising the flag, the further fields being of known length specified by the protocol.

The address field length of the discovery response may enable the discoverable unit and each of the entities to which the discoverable unit is capable of routing messages to be individually addressed. The entities may comprise entities internal to the discoverable unit and entities external to the discoverable unit.

The discovery request may comprise an address field and subsequent fields, the address field and subsequent fields all being populated with bits having a first bit value, and the discoverable unit may be configured to consider the discoverable unit to have an address consisting of bits all having the first bit value, and thereby determine the discovery request as being addressed to the discoverable unit.

The discoverable unit may be configured to treat the discovery request address field as being the same length as the length of the address field of the discovery response.

The subsequent fields of the discovery request may comprise a type identifier field and a payload, and the discoverable unit may be configured to interpret the type identifier as indicating the discovery request to be a discovery request, and in response generate the discovery response.

The discoverable unit may be configured to receive a subsequent message from the communication unit, the header of the subsequent message comprising an address field having the same address field length as the discovery response, the address field populated with the address of a first one of the individually addressable entities; read the address in the address field of the subsequent message; and route the subsequent message on to the first one of the individually addressable entities.

The discoverable unit and the individually addressable entities may form part of a system. The discoverable unit may be configured to, prior to routing the subsequent message onto the first one of the individually addressable entities, rebase the address in the address field of the subsequent message in dependence on the relative position within the system of the discoverable unit and the first one of the individually addressable entities.

BRIEF DESCRIPTION OF THE DRAWINGS

The present disclosure will now be described by way of example with reference to the accompanying drawings. In the drawings.

DETAILED DESCRIPTION

Figure 1:
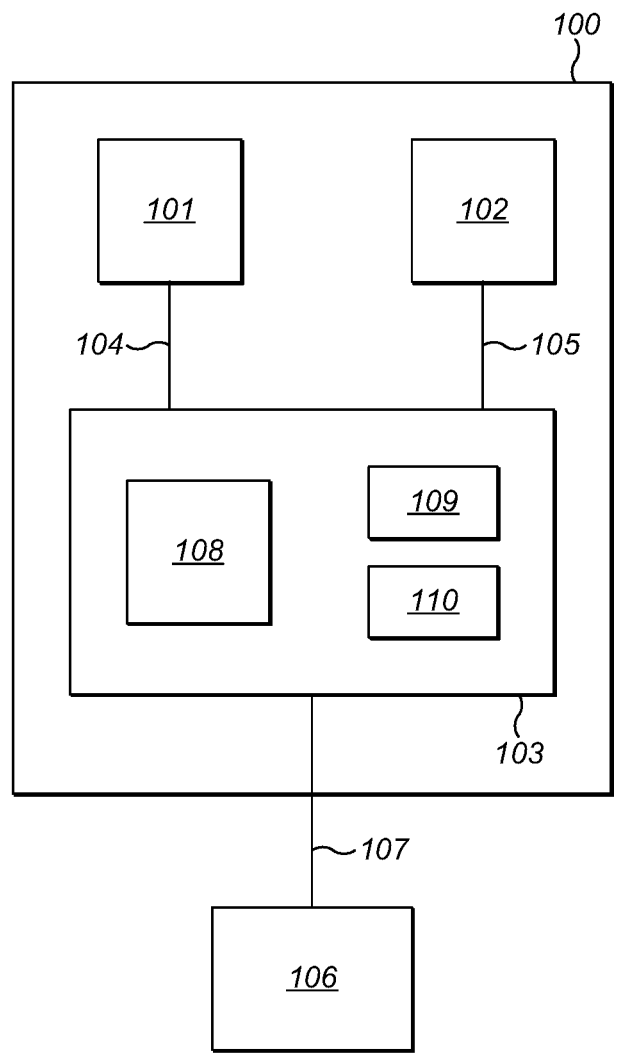
FIG. 1 is a schematic diagram of an integrated circuit.

FIG. 1 shows an integrated circuit 100. The integrated circuit is formed on a single semiconductor substrate. The integrated circuit comprises modules 101, 102, 103. Module 103 can communicate with modules 101 and 102 over data links 104, 105. Module 103 can also communicate with a separate device 106 over a data link 107. Each of modules 101, 102 and 103 together with separate device 106 is capable of communicating by means of the addressing protocol described below. In one example, modules 101 and 102 are part of a system-on-chip together with module 103. In this example, module 103 is configured for collecting debugging information relating to the operation of modules 101 and 102, for example details of operations that have been performed by these modules, and passing that information to an analysis terminal 106 which is external to the system-on-chip.

Figure 2:
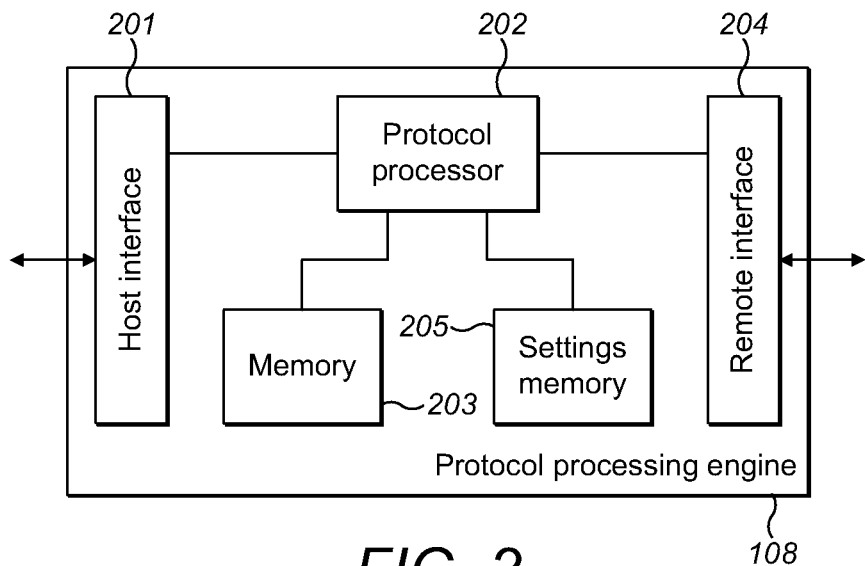
FIG. 2 is a schematic diagram of a protocol processing engine.

FIG. 2 shows a protocol processing engine 108 that can be implemented in any of modules 101, 102, 103 and device 106 in order to support the addressing protocol described below. The protocol processing engine has a local interface 201 for receiving data from and presenting data to the host entity (e.g. module 101) in which it is implemented. Local interface 201 is coupled to a protocol processor 202. The protocol processor 202 is a data processing device configured to execute program code stored in a non-transient manner in memory 203. The program code is such as to cause the protocol processor to implement the addressing protocol described below. Certain parameters governing the operation of the protocol are defined and stored in a settings memory 205. Some of these parameters may be pre-stored in memory 205 when the protocol processing engine 108 is manufactured. Settings memory 205 can be read by protocol processor 202. Protocol processor 202 is able to write parameters to settings memory 205. Instead of being controlled by software, the protocol processor could be implemented as dedicated hardware. A remote interface 204 is coupled to the protocol processor for transmitting data to and receiving data from a remote entity. When the protocol processing engine is implemented on an integrated circuit, as in the environment of FIG. 1, the remote entity could be implemented on that same integrated circuit or elsewhere.

In operation, data for transmission can be received over local interface 201 by the protocol processing engine 108. The protocol processor 202 packages that data into appropriately formatted packets and transmits them to the intended destination over remote interface 204. The protocol processing engine can also handle ancillary tasks such as computation of error check data, retransmission of data as required, and link state synchronisation. At the opposite end of the link a similar protocol processing engine receives the packets over its remote interface 204, extracts the payload or traffic data from the packets and presents it to its host over its local interface 201. That protocol processing engine also handles ancillary tasks such as checking received data for errors, requesting retransmission or providing acknowledgements, and link synchronisation.

The addressing protocol used by the protocol processing engine will now be described in detail.

Figure 3:
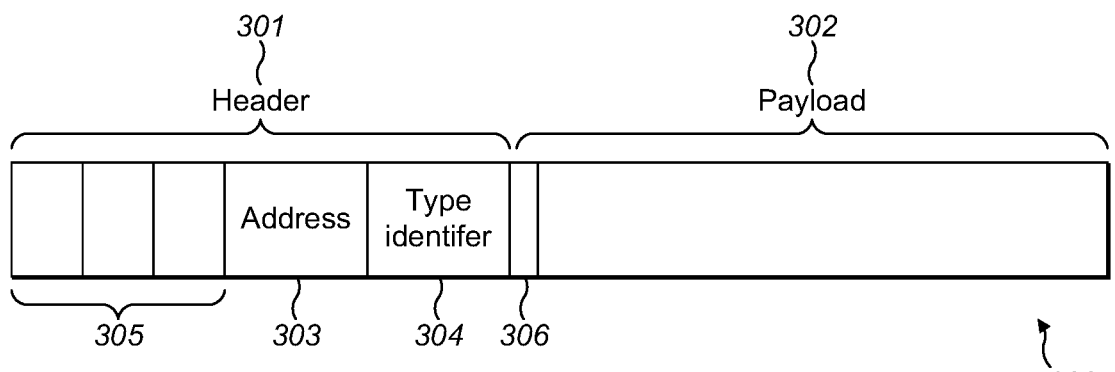
FIG. 3 shows a packet format.

Units communicate according to the protocol via data packet exchange. FIG. 3 illustrates an example data packet 300. The packet 300 includes a header 301 and a payload 302. The payload comprises the data to be communicated. The header comprises an address field 303 for indicating an intended destination of the packet. The header also comprises a type identifier field 304 for indicating the type of data in the packet. Other fields 305 may be in the header, for example fields indicating the length of the payload, the priority level of the data, error correction bits etc. In the example of FIG. 3, the type identifier field 304 directly follows the address field 303, and the payload 302 directly follows the type identifier field 304. Alternatively, the type identifier field may precede the address field in the header. The payload 302 may directly follow the address field 303. Alternatively, there may be other fields 305 between the address field 303 and the payload 302.

The length of each field in the header is specified by the protocol with the exception of the length of the address field. The address field is not of a predetermined length. Unit addresses according to the protocol are not of a predetermined length. The protocol allows for variable length addresses.

The number of individually addressable entities on a chip (such as chip 100) is known at the time the chip is manufactured. Some of these entities may be internal to other entities. For example, sub-units 109 and 110 are internal to unit 103. Each of these entities has a different address. Suitably, for a given chip, the address field length utilised by all the entities on that chip is the same. That address field length is the shortest length which enables all the individually addressable entities on the chip to be individually addressed. The address field length is known to the units on the chip prior to those units communicating with each other or units external to the chip. For example, the address field length may be stored at the units on chip during manufacture or programmed to the units after manufacture. The address field length may be stored in the settings memory 205 of each unit.

When a communication unit, for example device 106, initiates communications with a discoverable unit, for example unit 103, the communication unit does not initially know the address of the discoverable unit. The communication unit does not know the length of the address of the discoverable unit. Thus, the communication unit does not know the length of the address field in the messages the discoverable unit communications with. This information is not exchanged prior to the communication unit initiating communication with the discoverable unit.

The communication unit initiates communications with the discoverable unit by sending a message to the discoverable unit. This message is a discovery request. The discovery request may have the format described with respect to FIG. 3, or one of the other formats described above. The address field of the discovery request may be populated with bits all having the same bit value. The payload is also populated with bits all having the same bit value. The bit value of the bits in the payload is the same as the bit value of the bits in the address field. The type identifier field of the discovery request is populated with a type identifier which every device receiving the discovery request interprets to be identifying the message as a discovery request. If the discovery request has the format shown in FIG. 3, then the type identifier field is also populated with bits having the same bit value. In this case, the bit value of the bits in the type identifier field is the same as the bit value of the bits in the address field and the bits in the payload. If the type identifier field precedes the address field in the header of the discovery request, then the type identifier field may be populated with bits having different bit values to those of the address field and payload. In summary, the address field in the header of the discovery request, and all the fields that follow the address field in the discovery request (which includes at least the payload) are wholly populated by bits having the same bit value. For example, that bit value may be 0. Alternatively, that bit value may be 1.

Figure 4:
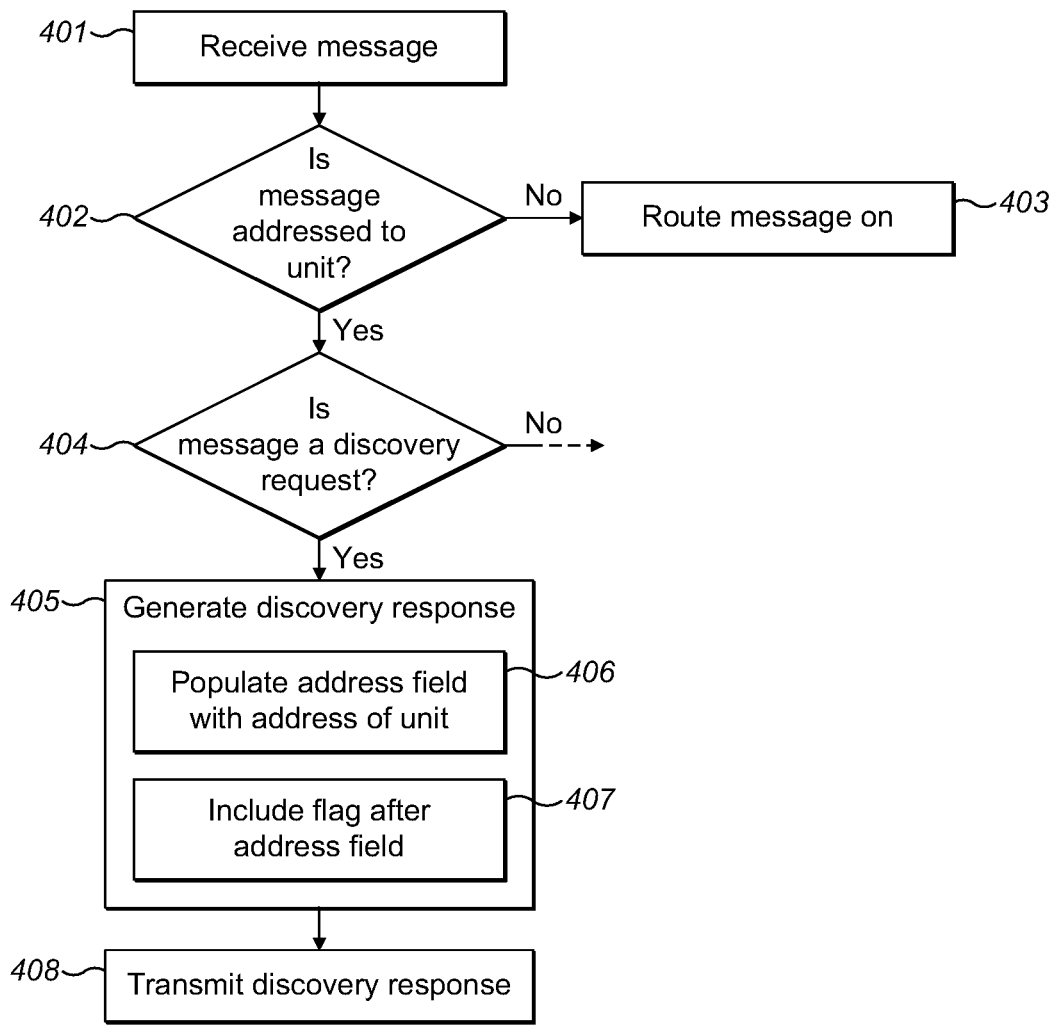
FIG. 4 is a flowchart illustrating the processing of a discovery request.

The discoverable unit receives the discovery request. FIG. 4 is a flowchart illustrating the discoverable unit's processing of the discovery request. At step 401, the discoverable unit receives the message. The protocol processor 202 of the discoverable unit is configured to read the message. The processor assumes the format of the message is as specified by the protocol, and that the address field length is that determined for the discoverable unit as described above. In other words, the processor processes the message as if the address field has the length which the processor has stored in the settings memory 205.

At step 402, the processor 202 determines whether the message is addressed to the discoverable unit. In this example, the discoverable unit considers itself to have an address consisting of bits which all have the same bit value. This bit value is the same as the bit value of the address field and those fields subsequent to it in the discovery request. The length of the address field assumed by the processor of the discoverable unit may be shorter than, the same as, or longer than the address field specified by the processor of the communication unit when generating the discovery request. However, since the bits of the address field and all those fields which follow it in the discovery request have the same bit value, the processor of the discoverable unit determines the discovery request to be addressed to it even though it may read some bits of fields subsequent to the address field to be part of the address.

If the discoverable unit considers itself to have an address consisting of bits which do not all have the same bit value, then at step 402 it determines that the message is not addressed to it. In this case, it routes the message on to other units at step 403. Those other units process the message in accordance with the method described with reference to FIG. 4.

Having determined that the message is addressed to it, the discoverable unit determines whether the message is a discovery request at step 404. The processor of the discoverable unit is configured to read the content of the type identifier field of the message. The processor interprets the type identifier as indicating that the message is a discovery request. In the case that the discovery request has the format shown in FIG. 3, the type identifier is between the address and the payload in the packet. Thus, the type identifier is a sequence of bits all of which have the same bit value, which is the same bit value as the bits of the address and payload of the discovery request. The discoverable unit is configured to interpret this sequence of the same bit value to identify the message as a discovery request.

In response to determining that the received message is a discovery request intended for it, the discoverable unit generates a discovery response at step 405. The protocol processor 202 uses an address field in the header of the discovery response of the length determined for the discoverable unit, as described above. At step 406, the processor 202 populates the address field of the discovery response with the address of the discoverable unit. Thus, the address field is populated with bits all having the same bit value. The address field is wholly populated with bits having the same bit value. At step 407, the processor 202 includes a flag after the address field of the discovery response. The flag may directly follow the address field. Alternatively, there may be one or more further fields between the address field and the flag. Any further fields between the address field and the flag are set by the protocol. The lengths of those further fields are set by the protocol. The flag has a different bit value to the bit value of the address. Any intermediate bits between the address field and the flag suitably have the same bit value as the bits of the address. Thus, the flag is the first bit which has a different bit value since the first bit of the address. The flag may be in the payload. The flag may be the first bit of the payload. In the packet format shown in FIG. 3, the flag 306 is the first bit of the payload, and the address field 303 and the flag 306 are separated by the type identifier field 304. In the example of FIG. 3, the address field 303 and the type identifier field 304 of the discovery response are wholly populated by the same bit value, for example 0. The flag 306 is the first bit since the beginning of the address field 303 to have a different bit value, i.e. 1. If the type identifier field 304 precedes the address field in the header of the discovery request, then the type identifier field may be populated with bits having different bit values to those of the address field. Having generated the discovery response, at step 408 the discoverable unit sends the discovery response to the communication unit.

Figure 5:
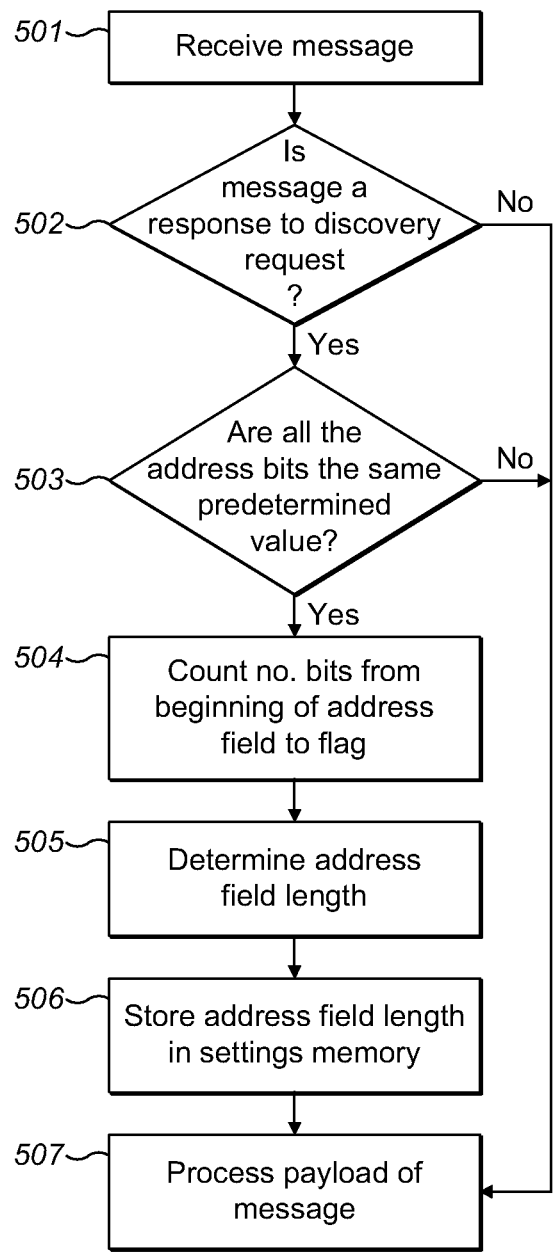
FIG. 5 is a flowchart illustrating the processing of a discovery response.

The communication unit receives the discovery response from the discoverable unit. FIG. 5 is a flowchart illustrating the communication unit's processing of the discovery response.

At step 501, the communication unit receives a message. The protocol processor 202 of the communication unit is configured to read the message. At step 502, the processor 202 determines whether the message is a response to the discovery request. The processor reads the type identifier. In the case that the type identifier field is between the address field and the flag of the discovery response, as shown in FIG. 3, the type identifier is a sequence of bits all having the same bit value. The processor interprets this type identifier as identifying the message as a discovery response. In the case that the type identifier precedes the address in the header of the discovery response, the type identifier may be a different sequence of bits. In this case, that sequence of bits is specified in the protocol to indicate that the message is a discovery response, in which case the communication unit identifies the message to be a discovery response. If the processor determines that the message is not a discovery response to the discovery request, then it processes the payload of the message at step 507. If the processor determines that the message is a discovery response to the discovery request, then it moves on to step 503.

At step 503, the processor determines whether the address bits in the discovery response all have the same predetermined bit value. If the bits of the address field are not all the same, then the processor processes the payload of the message at step 507. If the processor determines that the address bits are all the same, then it moves on to step 504.

The length of the address field in the discovery response is not specified by the protocol. Thus, the communication unit does not know the length of the address field at the time it receives the discovery response. At step 504, the protocol processor 202 of the communication unit determines the length of the address field of the discovery response by counting the number of bits from the beginning of the address field to the flag. In other words, the processor counts the number of consecutive bits which have the same bit value starting at the beginning of the address field. The flag is the first bit which has a different bit value to the bit value of the bits of the address. At step 505, the processor determines the address field length. The protocol sets whether there are any intermediate fields between the addressing field and the flag. If the flag directly follows the address, then the processor determines the bit length of the address field to be the number of consecutive bits having the same bit value from the beginning of the address field. If there are one or more intermediate fields between the address field and the flag, then the processor determines the bit length of the address field to be the number of consecutive bits having the same bit value from the beginning of the address field minus the number of bits of the one or more intermediate fields. The determined bit length of the address field indicates the number of individually addressable entities via the discoverable unit. For example, if the communication unit determines the address field to be 8 bits long, then it determines that there is a maximum of 256 individually addressable entities via the discoverable unit, which includes the discoverable unit itself. At step 506, the communication unit may store the address field length in the settings memory 205. The processor then processes the payload of the discovery response at step 507.

Having determined the address field length, the communication unit may subsequently send a message to one of the individually addressable entities. To do this, the protocol processor 202 of the communication unit forms a packet by concatenating a header and a payload. The header comprises an address field having the length determined above. The address field is populated with the address of the entity that the communication is to communicate with. The payload comprises the data that the communication unit is to send to the entity. The communication unit sends the packet to the discoverable unit. The discoverable unit receives the packet. The discoverable unit reads the address in the address field of the subsequent message. The discoverable unit determines that the address is not that of the discoverable unit. The discoverable unit routes the subsequent message onto the addressed unit.

Prior to routing the subsequent message on, the discoverable unit may first rebase the address in the address field of the subsequent message in dependence on the relative position of the discoverable unit and the addressed unit in the communication system. This rebasing mechanism of the addressing protocol will now be described.

In the following rebasing mechanism, each unit in a system considers itself to have the same address, which is referred to in the following as the base address. Each unit through which a message is routed on its path to a destination unit re-indexes/rebases the destination address of that message.

Figure 6:
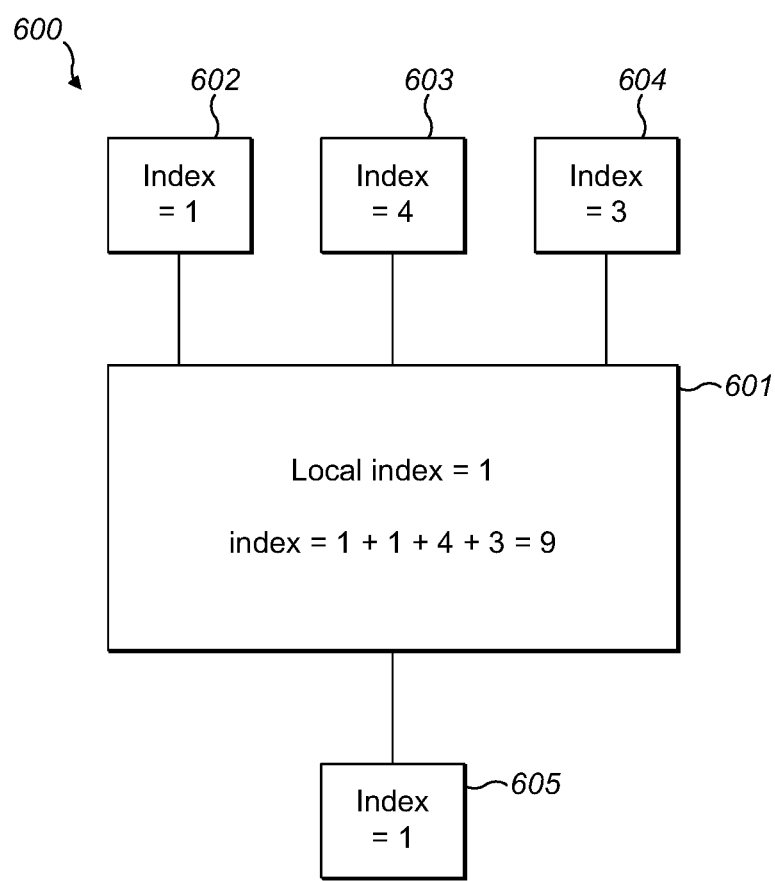
FIG. 6 illustrates exemplary address indices of units in a hierarchical system.

FIG. 6 illustrates an example system. Shared hub 601 is connected to three peripheral units 602, 603 and 604, and a communication unit 605.

Consider the case where the communication unit 605 sends a message to peripheral unit 604. Communication unit 605 sends the message to shared hub 601. Shared hub 601 routes the message to peripheral unit 604.

Each unit in the system has one or more address indices. For example, if all the messages that a unit receives are internally received by the same subunit, then that unit suitably has one address index. If however, the messages that a unit receives are routed to different locations internally or to different units, then that unit suitably has more than one address index to facilitate that routing. In the example of FIG. 6, peripheral unit 602 has 1 address index, peripheral unit 603 has 4 address indices, and peripheral unit 604 has 3 address indices. Communication unit 605 has 1 address index. Shared hub 601 has 1 local index. In other words, it has 1 index internal to the shared hub. All messages which are received by that shared hub are internally received by the same subunit. However, because the shared hub routes messages onto peripheral units 602, 603 and 604, the message index of the shared hub is the sum of: (i) the message indices of all the units to which it routes messages higher in the hierarchy; and (ii) its local index. Thus, as illustrated on FIG. 6, the message index of shared hub 601 is 9.

Consider the case where the base address is 0. Communication unit 605 has 1 address index, thus considers itself to have an address which is 0. According to communication unit 605, shared hub 601 has address 1, peripheral unit 602 has address 2, peripheral unit 603 has addresses 3-6, and peripheral unit 604 has addresses 7-9. Thus, communication unit 605 includes the destination address 7 in the message that it sends to shared hub 601 to be routed to peripheral unit 604. Shared hub 601 receives the message. From the viewpoint of shared hub 601, shared hub 601 has address 0, peripheral unit 602 has address 1, peripheral unit 603 has addresses 2-5, and peripheral unit 604 has addresses 6-8. Shared hub 601 rebases the destination address of the message such that it is the address of peripheral unit 604 from the viewpoint of shared hub 601. So, in this example, shared hub 601 rebases the destination address such that it is 6.

The shared hub 601 rebases the destination address by adding an offset to the destination address in the message that the shared hub received. The shared hub 601 determines the offset to apply to be $-(b+n)$. b is the number of address indices occupied by the unit in the hierarchical level below the unit that is rebasing the address. In this case, b is the index of the communication unit 605, i.e. b=1. n is the number of address indices occupied by the units which are in the same hierarchical level as the unit which is rebasing the address, but which have smaller addresses than the unit which is rebasing the address. In this case n=0. Thus, the offset is determined to be $-(1+0)=-1$. The destination address is thus rebased to $7-1=6$.

The shared hub 601 then routes the message onto the destination unit 604. From the view point of peripheral unit 604, peripheral unit 604 has addresses 0-2. The peripheral unit 604 rebases the destination address of the message by applying the offset $-(b+n)$. In this case, b is the index of the shared hub 601, i.e. b=1. n is the sum of the indices of peripheral units 602 and 603, i.e. n=5. Thus the offset is determined to be −(1+5)=−6. Thus, the destination unit 604 rebases the address to 6−6=0. Hence, the peripheral unit determines that the destination of the message is itself.

The described rebasing addressing mechanism allows each unit in the system to consider itself to have the same address. Thus, this addressing mechanism is compatible with a modular system comprised of identical structures with identical internal addresses.

The addressing protocol described above supports systems with different numbers of connected devices. It reduces the proportion of the packet header dedicated to addressing the intended addressee of the system by adopting the shortest address field which can be used to individually address the devices in the system. This is done without requiring the connected devices to have knowledge of the length of the address field prior to establishing communications with each other.

As indicated above, one application of the present protocol is in transmitting data regarding the status or previous operations of an integrated circuit or a module on an integrated circuit for debugging purposes. The present protocol can be applied in other applications, for example for transmitting data of any sort over a serial hardware link.

The entities at each end of a link preferably maintain local clocks which are synchronised so they can distinguish signals on the link on a common timebase. Signals on the link are preferably sent and received according to that timebase.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communication unit configured to communicate according to a protocol in which unit addresses are not of a predetermined length, the communication unit configured to:
   send a discovery request to a discoverable unit, wherein the discovery request comprises an address field, a type identifier field, and a payload, and wherein the address field, the type identifier field, and the payload are wholly populated with bits having a same bit value;
   receive a discovery response from the discoverable unit, the discovery response comprising an address field of length unknown to the communication unit, the discovery response further comprising a flag following the address field; and
   determine the address field length by counting a number of bits prior to the flag.

2. A communication unit as claimed in claim 1, wherein the address field is populated with bits all having a first bit value, the flag having a second bit value different to the first bit value.

3. A communication unit as claimed in claim 2, wherein the discovery response comprises a header and a payload, the header comprising the address field and further fields, the payload comprising the flag, the further fields being of known length to the communication unit.

4. A communication unit as claimed in claim 3, wherein the flag is the first bit of the payload.

5. A communication unit as claimed in claim 3, wherein the further fields comprise a type identifier field populated with bits all having the first bit value, the communication unit configured to interpret the type identifier as indicating the discovery response to be a response to a discovery request.

6. A communication unit as claimed in claim 1, wherein the communication unit is further configured to interpret the determined address field length as indicating a number of individually addressable entities.

7. A communication unit as claimed in claim 6, wherein the communication unit is further configured to subsequently send a message to a first one of the individually addressable entities by concatenating a header and a payload, the header comprising an address field having the determined address field length, the address field populated with the address of the first one of the individually addressable entities.

8. A discoverable unit configured to communicate according to a protocol in which unit addresses are not of a predetermined length, the discoverable unit configured to:
   receive a discovery request from a communication unit, wherein the discovery request comprises an address field and subsequent fields, and wherein the address field and subsequent fields are wholly populated with bits having a same first bit value;
   generate a discovery response, the discovery response comprising an address field of length not fixed by the protocol, the address field populated with an address of the discoverable unit, the discovery response further comprising a flag following the address field; and
   send the discovery response to the communication unit.

9. A discoverable unit as claimed in claim 8, wherein the address field is populated with bits all having a first bit value, the flag having a second bit value different to the first bit value.

10. A discoverable unit as claimed in claim 8, wherein the discovery response comprises a header and a payload, the header comprising the address field and further fields, the payload comprising the flag, the further fields being of known length specified by the protocol.

11. A discoverable unit as claimed in claim 10, wherein the flag is the first bit of the payload.

12. A discoverable unit as claimed in claim 8, wherein the address field length of the discovery response enables the discoverable unit and each entity of individually addressable entities to which the discoverable unit is capable of routing messages to be individually addressed.

13. A discoverable unit as claimed in claim 12, wherein the individually addressable entities comprise entities internal to the discoverable unit and entities external to the discoverable unit.

14. A discoverable unit as claimed in claim 12, wherein the discoverable unit is configured to consider the discoverable unit to have an address consisting of bits all having the first bit value, and thereby determine the discovery request as being addressed to the discoverable unit.

15. A discoverable unit as claimed in claim 8, wherein the discoverable unit is further configured to treat the address field of the discovery request as being a same length as the length of the address field of the discovery response.

16. A discoverable unit as claimed in claim 14, wherein the subsequent fields of the discovery request comprise a type identifier field and a payload, the discoverable unit configured to interpret the type identifier as indicating the discovery request to be a discovery request, and in response generate the discovery response.

17. A discoverable unit as claimed in claim 12, wherein the discoverable unit is further configured to:
  receive a subsequent message from the communication unit, wherein a header of the subsequent message comprises an address field having a same length as the address field length as the discovery response, and wherein the address field is populated with the address of a first entity of the individually addressable entities;
  read the address in the address field of the subsequent message; and
  route the subsequent message on to the first entity of the individually addressable entities.

18. A discoverable unit as claimed in claim 17, wherein the discoverable unit and the individually addressable entities form part of a system, and
  wherein the discoverable unit is configured to, prior to routing the subsequent message onto the first entity of the individually addressable entities, rebase the address in the address field of the subsequent message in dependence on a relative position within the system of the discoverable unit and the first entity of the individually addressable entities.

* * * * *